Oct. 16, 1951　　　A. J. PETZINGER　　　2,571,938
METER WITH SUPERVISORY WARNING INDICATOR
Filed Feb. 28, 1948
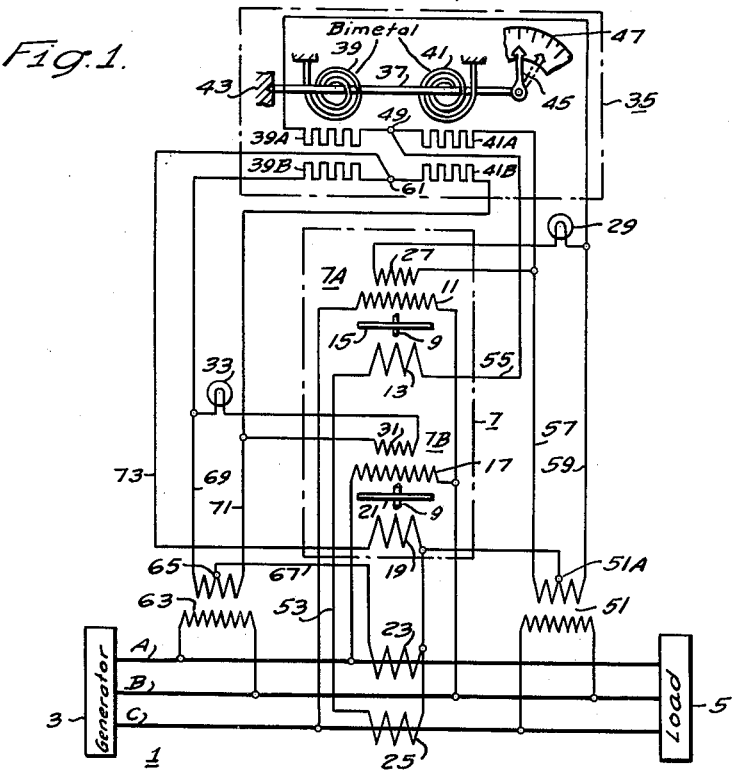
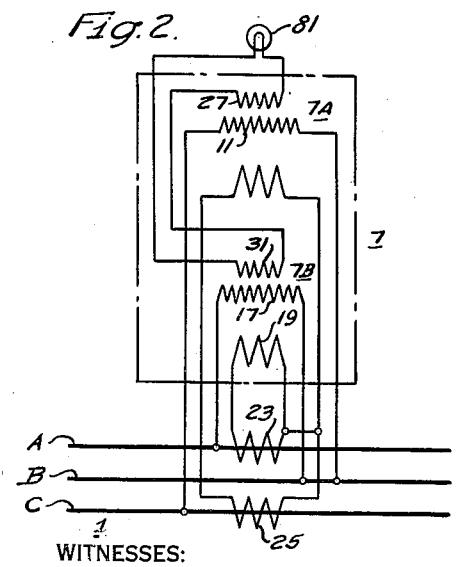
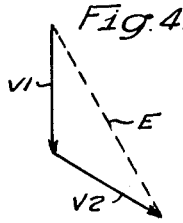
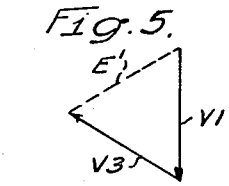
WITNESSES:
E. A. McCloskey
Wm. C. Groome
INVENTOR
Ambrose J. Petzinger.
BY C. L. Friedman
ATTORNEY Patented Oct. 16, 1951

2,571,938

UNITED STATES PATENT OFFICE 2,571,938

METER WITH SUPERVISORY WARNING INDICATOR

Ambrose J. Petzinger, Fair Lawn, N. J., assignor to Westinghouse Electric Corporation, East Pittsburgh, Pa., a corporation of Pennsylvania Application February 28, 1948, Serial No. 12,089

5 Claims. (Cl. 177—311)

1

This invention relates to electrical instruments and it has particular relation to electrical meters of the type having a plurality of voltage windings.

The invention is applicable to various electrical instruments, such as integrating meters, indicating instruments, recording instruments and relays. It is particularly applicable to plural-element electrical instruments, such as indicating, integrating or recording instruments for measuring the real or reactive power or energy of a three-wire single-phase electrical circuit or a polyphase circuit.

In a plural-element meter, two or more voltage windings cooperate with associated current windings for the purpose of actuating a common armature structure. Should one of the voltage windings become defective, the defect would not be apparent readily from an inspection of the meter for the reason that the intact element of the meter continues to actuate the armature structure. For the purpose of indicating the presence of a defective voltage winding, it is the practice to provide each of the voltage windings with an indicating device, such as a lamp, which is illuminated as long as the associated voltage winding is in operative condition. The provision of a separate indicating device for each voltage winding requires a substantial allocation of space therefor and increases the cost of the meter.

A further problem is presented by the combination watthour meter and thermal demand meter which may have a construction similar to that illustrated in the Vassar Patent 2,323,738. When this meter is arranged for polyphase operation, it may have four or more voltage windings associated therewith. The provision of a separate indicating device for each of the voltage windings would increase the space required and would add to the cost of the meter device.

In accordance with the invention, a plurality of voltage windings are provided with a single indicating device for indicating failure of any one of the associated voltage windings. To this end, each of the voltage windings may be provided with an auxiliary winding inductively coupled thereto. The auxiliary windings are connected in series for the purpose of energizing the common indicating device. The indicating device may have distinct indications for indicating that all of the voltage windings are in operating condition or that one of the voltage windings is defective.

It is, therefore, an object of the invention to provide an electrical instrument having a plurality of voltage windings with common means

2 for indicating the failure of any one of the voltage windings.

It is a further object of the invention to provide a plural-element measuring device having a separate voltage winding for each of the elements with an auxiliary winding inductively coupled to each of the voltage windings, the auxiliary windings being connected in series for the purpose of energizing a common indicating device.

It is a still further object of the invention to provide a measuring device having a plurality of plural-element meters with a common indicating device energized in accordance with the combined voltages of voltage windings associated respectively with each of the meters.

Other objects of the invention will be apparent from the following description, taken in conjunction with the accompanying drawing, in which:

Figure 1 is a schematic view of a measuring device embodying the invention;

Fig. 2 is a schematic view of a measuring device illustrating a modified form of the invention, and Figs. 3, 4 and 5 are vector diagrams illustrating voltage conditions present in the measuring device of Fig. 2.

Referring to the drawing, Fig. 1 shows an electrical circuit 1 for supplying electrical energy from a generator 3 to a load 5. The circuit may be a three-wire single-phase circuit or a polyphase circuit, as desired. For example, the invention is applicable to meters associated with a three-phase, four-wire, star-connected circuit. However, for the purpose of discussion, it will be assumed that the circuit is a three-phase three-wire circuit having phase conductors A, B and C, operating at a frequency of 60 cycles per second.

In order to measure energy supplied by the generator 3 to the load 5, a conventional two-element watthour meter 7 is provided. This meter has an armature assembly including a common shaft 9 which is mounted for rotation with respect to the associated windings. The meter also includes two elements 7A and 7B which are associated with the common shaft. The element 7A includes a voltage winding 11, and a current winding 13. These windings, when energized, cooperate with a conventional magnetic structure in a manner well understood in the art to produce a shifting magnetic field within which a part of an electroconductive armature or disc 15 is positioned for rotation. The disc 15 is secured to the shaft 9. Similarly, the element 7B of the meter includes a voltage winding 17, a current winding 19 and an electroconductive armature or disc 21.

Current for the current windings of the meter 7 is supplied by two current transformers 23 and 25 which are associated, respectively, with the conductors A and C of the three-phase circuit. As hereinafter pointed out, the current winding 13 is energized from the current transformer 25 in accordance with current flowing in the conductor C. The current winding 19 is energized from the current transformer 23 in accordance with current flowing through the conductor A. By inspection of Fig. 1, it will be observed that the voltage winding 11 is connected for energization in accordance with the voltage between the conductors B and C. The voltage winding 17 is connected for energization in accordance with the voltage between the conductors A and B. With the windings connected as illustrated and with polarities properly selected, the meter 7 measures energy supplied from the generator 3 to the load 5 in a manner well understood in the art. It will be understood that conventional damping magnets, registers and other accessories may be incorporated in the meter 7, as desired.

As previously pointed out, it is conventional practice to provide devices for indicating the condition of the voltage windings 11 and 17. For example, the voltage winding 11 has inductively coupled thereto an auxiliary winding 27. This auxiliary winding energizes a suitable voltage responsive indicating device 29 which may be in the form of a voltmeter. However, since lamps are available in extremely small sizes and require negligible energizing current, it is common practice to employ a lamp as the indicating device 29. Similarly, an auxiliary winding 31 is inductively coupled to the voltage winding 17 for the purpose of supplying energy to an indicating device, such as a lamp 33.

It is desirable in many installations to provide an indication of the power demand required by the load 5. Such a demand is provided by means of a thermal demand meter 35 which may be of any desired design. For the purpose of discussion it may be assumed that the meter 35 is of the general type described in the Lincoln et al. Patent 1,300,283. Such a demand meter may include a shaft 37 having two thermo-responsive elements such as bimetallic spiral springs 39 and 41 wound thereabout in opposite directions. The shaft is mounted for rotation with respect to a supporting structure 43 to which the outer ends of the spiral springs are attached. The inner ends of the springs are attached to the shaft for the purpose of actuating the shaft in accordance with the difference between the temperatures of the springs. Rotation of the shaft actuates a pointer 45 across a suitable scale 47.

Heat is supplied to the bimetallic spiral spring 39 from two heaters 39A and 39B. Similarly, heat is supplied to the spiral spring 41 from two heaters 41A and 41B. The heaters 39A and 41A each have an end connected to a common terminal 49 and also are connected in series across a secondary winding of a voltage transformer 51. The primary winding of the voltage transformer 51 is connected for energization in accordance with the voltage between the conductors B and C of the circuit 1. A center tap 51A is provided on the secondary winding of the transformer 51. The heaters 39A and 41A together with the current winding 13 of the meter 7 are energized from the current transformer 25 through a circuit which may be traced from the left-hand terminal of the secondary winding of the transformer 25 through a conductor 53, the current winding 13, a conductor 55, the terminal 49, the heaters 39A and 41A in parallel, the conductors 57 and 59 and the center tap 51A back to the right-hand terminal of the secondary winding of the transformer 25.

In an analogous manner, the heaters 39B and 41B each have an end connected to a common terminal 61 and are connected in series across the secondary winding of a voltage transformer 63. The transformer 63 has a primary winding connected for energization in accordance with the voltage between the conductors A and B. The secondary winding of the transformer 63 is provided with a center tap 65. The heaters 39B and 41B together with the current winding 19 are energized from the current transformer 23 through a circuit which may be traced from the left-hand terminal of the secondary winding of the transformer 23 through a conductor 67, the center tap 65, the conductors 69 and 71 in parallel, the heaters 39B and 41B, the terminal 61, a conductor 73 and the current winding 19 back to the right-hand terminal of the secondary winding of the transformer 23. The polarities may be such that the heaters 39A and 41A are heated respectively in accordance with the sum and difference of the voltage applied to the transformer 51 and the current flowing through the conductor C. Also, the heaters 39B and 41B may be heated respectively in accordance with the sum and difference of voltage applied to the transformer 63 and current flowing in the conductor A. As explained in the aforesaid Lincoln et al. patent, the thermal demand meter 35 then may be calibrated to indicate the power demand of the load 5. Connections of similar meters to other polyphase circuits, such as a three-phase, four-wire star-connected circuit, are well known in the art. See for example the Electrical Meterman's Handbook, published by Edison Electric Institute, New York city, 1940.

It will be noted that the thermal demand meter 35 has added two voltage transformers 63 and 51 to the system. Since the thermal demand meter in effect is a two-element meter, it may continue to indicate a power demand even though one of the transformers 51 or 63 is defective. For this reason, mere inspection of the thermal demand meter does not indicate a failure of one of the voltage transformers. Although each of the voltage transformers 51 and 63 may be provided with a separate voltage indicating device or lamp, the added space and cost requirements have discouraged the adoption of such devices.

In accordance with the invention, the indicating devices, or lamps 29 and 33, are employed, not only for indicating the condition of the voltage windings 11 and 17, but they are employed also for indicating the condition of the transformers 51 and 63. To this end, the auxiliary winding 27 and the secondary winding of the transformer 51 are connected in series for the purpose of energizing the indicating device or lamp 29. Similarly, the auxiliary winding 31 and the secondary winding of the transformer 63 are connected in series for the purpose of supplying energy to the indicating device or lamp 33.

It is believed that the operation of the indicating devices now may be set forth. Since various sequences are possible, some of the sequences will be briefly discussed. Let it be assumed that the voltage winding 27 and the secondary winding of the transformer 51 when energized provide equal and opposite voltages in the series circuit which supplies energy to the lamp 29. Under such conditions the lamp is extinguished if the voltage winding 11 and the transformer 51 both are in operating condition. Should the voltage winding 11 or the primary winding of the transformer 51 become open circuited, a resultant voltage would be applied to the lamp 29 and the resulting illumination of the lamp would indicate that one of the windings is defective. Although this sequence could be employed, it has the objections that a failure of the lamp 29 or a simultaneous failure of the voltage winding 11 and the primary winding of the transformer 51 would provide the same indication as that representing the normal operating condition of the voltage winding and the transformer 51.

Let it be assumed next that the voltage supplied by one of the two windings, such as the auxiliary winding 27, is larger than that supplied by the secondary winding of the transformer 51. The lamp 29 then would be proportioned to the windings to provide a first indication when the auxiliary winding 27 alone supplies voltage to the lamp wherein the lamp is brightly illuminated. The proportions are such that, when the secondary winding of the transformer 51 has a voltage bucking that of the auxiliary winding 27, the resultant voltage dimly illuminates the lamp 29. The lamp 29 may be completely extinguished when the secondary winding of the transformer 51 alone supplies voltage thereto. Under these conditions, a dimly illuminated lamp 29 indicates normal operating conditions for the associated windings. A brightly illuminated lamp 29 indicates that the transformer 51 is defective. If the lamp is completely extinguished, either the lamp itself is defective or the voltage winding 11 has failed.

Another sequence may be obtained if the polarities of the secondary winding of the transformer 51 and the auxiliary winding 27 are arranged in series-aiding relationship with reference to the lamp 29. Let it be assumed that the voltage supplied by the auxiliary winding 27 alone suffices to illuminate dimly the lamp 29 and that the resultant voltage supplied by the auxiliary winding 27 and the secondary winding of the transformer 51 in series suffices to illuminate brightly the lamp 29. The secondary voltage of the transformer 51 alone is insufficient to illuminate the lamp. Under these conditions, a bright illumination of the lamp 29 indicates normal operating conditions for the voltage winding 11 and the transformer 51. If the lamp 29 is dimly illuminated, it follows that the transformer 51 is defective. If the lamp 29 is completely extinguished, the lamp is defective, the voltage winding 11 is open circuited or possibly both the voltage winding 11 and the transformer 51 are both defective. From the foregoing analysis, it is clear that the single lamp 29 gives all information required for the transformer 51 and the voltage winding 11.

If desired, the voltage outputs of the windings 27 and the secondary winding of the transformer 51 may be made equal. Either voltage alone may be made sufficient to illuminate the lamp dimly or fail to illuminate the lamp at all, if so desired. The two voltages in series are designed to illuminate the lamp brightly. Under these circumstances, failure of the lamp 29 to provide a bright illumination indicates that one of the windings is defective.

A similar sequence may be employed for the lamp 33 with respect to its auxiliary winding 31, the associated voltage winding 17 and the transformer 63. Consequently, the two lamps 29 and 33 provide all information required for four sets of windings.

The currents required to illuminate the lamps 29 and 33 may be so small that the lamps have negligible effects on the performance of the meter units.

The invention also may be incorporated in a single plural-element meter. Thus, a single lamp may be associated with the secondary windings of the transformers 51 and 63 or a single lamp may be associated with the auxiliary windings 27 and 31 or both such lamps may be employed. It will be noted, however, that in Fig. 1 each lamp has applied thereto two series-aiding or series-bucking voltages. In the alternative arrangements now to be discussed, each lamp would be energized by a plurality of voltages differing in phase by angles other than zero or 180°. For example, in Fig. 2, the two element meter 7 is shown associated with a voltage indicating device such as a lamp 81.

Energization for the lamp 81 is obtained from the two auxiliary windings 27 and 31 which are connected in series. For the purpose of illustrating the operation of the lamp 81, it will be assumed that the line voltages are as indicated in Fig. 3. It will be assumed further that the output voltage of the auxiliary winding 31 is represented by a voltage vector V1 in Fig. 4. A unity transformation ratio is assumed. The polarity of the voltage output of the auxiliary winding 27 is selected to provide in the series circuit of the lamp 81 a voltage represented by the voltage vector V2 in Fig. 4. Consequently, a resultant voltage E is applied to the lamp 81 under normal operating conditions which is equal to the voltage across either of the windings 27 or 31 multiplied by the square root of 3. Under these conditions, the lamp 81 is brightly illuminated. If either of the voltage windings 11 or 17 becomes open circuited, the lamp 81 is extinguished.

If it is desired to have an indication as to which of the windings is defective, a separate resistor having a high value of resistance may be connected across each of the auxiliary windings 27 and 31. One of the windings then may have a voltage output proportioned to illuminate the lamp 81 dimly, whereas the remaining winding has a voltage output which alone is insufficient to illuminate the lamp at all. The vector sum of the two voltages, however, is sufficient to illuminate the lamp brightly. Under these circumstances, the condition of the lamp indicates which winding is defective. However, the added complication of the resistor ordinarily is not justified.

Referring again to Fig. 4, it may be well to point out that a reversal in phase resulting from improper connections of one of the voltage windings may be indicated by the lamp 81. For example, let it be assumed that the connections of the voltage winding 11 across the conductors B and C are reversed. Under such circumstances, the vector relationships of Fig. 4 no longer apply. The new vector relationships are illustrated in Fig. 5. The voltage vector V2 of Fig. 4 is replaced by a voltage vector V3 representing the voltage across the winding 27. The vectors V2 and V3 are equal in magnitude but opposed in phase. It will be noted that the resultant voltage E' is substantially smaller than the resultant voltage E of Fig. 4. In fact E'=V1=V3 in magnitude. The lamp 81 may be selected to illuminate dimly in response to the resultant voltage E' or to remain extinguished, as desired. In either case, attention will be directed to the improper connection of the meter.

Although the invention has been discussed with reference to certain specific embodiments thereof, numerous modifications falling within the spirit and scope of the invention are possible.

I claim as my invention:

1. In an electrical meter device, an electroresponsive thermal meter, a voltage transformer having a secondary winding for supplying electrical energy to the thermal meter, an integrating meter having a voltage winding and having an auxiliary winding inductively coupled to the voltage winding, an electroresponsive indicating device, and connections connecting the secondary winding and the auxiliary winding in series for energizing the indicating device, the secondary winding and the auxiliary winding being designed to provide voltages for energizing the indicating device to present different indications when the voltage windings are in operating condition and when the voltage transformer or the voltage winding is defective.

2. In an electrical meter device, an electroresponsive thermal meter, a voltage transformer having a secondary winding for supplying electrical energy to the thermal meter, an integrating meter having a voltage winding and having an auxiliary winding inductively coupled to the voltage winding, an electroresponsive indicating device, and connections connecting the secondary winding and the auxiliary winding in series for energizing the indicating device, the indicating device comprising an electric lamp, the transformer and the windings being designed to supply voltages to the indicating device which provide a first degree of illumination of the lamp when the transformer and windings are in operating condition, a second degree of illumination when the transformer is defective, and a third degree of illumination when the voltage winding is defective.

3. A meter device comprising a pair of plural-element meters, each of said meters having a pair of voltage windings, a pair of auxiliary windings inductively coupled respectively to one of the voltage windings of each of the meters, and a voltage-responsive indicating device connected in series with said auxiliary windings for energization in accordance with the resultant voltage of said pair of auxiliary windings, the windings being proportioned to supply voltages to the indicating device which provide a first indication when the auxiliary windings and the associated pair of voltage windings are in operating condition, a second indication when a first one of the associated pair of voltage windings is defective, and a third indication when a second one of the associated pair of voltage windings is defective.

4. In an electrical measuring instrument having a first voltage winding, a first secondary winding mutually coupled to the first voltage winding, a second voltage winding, a second secondary winding mutually coupled to the second voltage winding and measuring means connected for energization in part from said secondary windings for measuring a desired electrical quantity, in combination with a voltage-responsive indicating device and connections connecting the indicating device and said secondary windings in a series circuit for energizing the indicating device in accordance with the resultant of the voltages across said secondary windings, the secondary windings being proportioned to supply voltages to the indicating device to provide a first indication when both of the voltage windings are in operating condition, a second indication when the first voltage winding is defective and a third indication when the second voltage winding is defective.

5. An instrument as claimed in claim 4, wherein the indicating device is a lamp having different degrees of illumination in response to different voltages applied thereto.

AMBROSE J. PETZINGER.

REFERENCES CITED

The following references are of record in the file of this patent:

UNITED STATES PATENTS

| Number | Name | Date |
|---|---|---|
| 1,569,299 | Preston | Jan. 12, 1926 |
| 1,960,848 | Jones | May 29, 1934 |
| 2,149,634 | Schweitzer, Jr. | Mar. 7, 1939 |
| 2,226,021 | Schweitzer, Jr. | Dec. 24, 1940 |
| 2,431,794 | Dichter | Dec. 2, 1947 |

FOREIGN PATENTS

| Number | Country | Date |
|---|---|---|
| 363,967 | Great Britain | Dec. 31, 1931 |